United States Patent Office 3,297,640
Patented Jan. 10, 1967

---

3,297,640
POLYSULFONES OF BICYCLO[3.2.0]HEPT-2-EN-6-ONE AND DERIVATIVES
John R. Caldwell and Edward H. Hill, Kingsport, Tenn., assignors to Eastman Kodak Company, Rochester, N.Y., a corporation of New Jersey
No Drawing. Filed May 15, 1963, Ser. No. 280,745
14 Claims. (Cl. 260—63)

This invention relates to resinous polysulfones and the method for preparing the same, and more particularly concerns those polysulfone resins prepared by reacting bicyclo(3.2.0)hept-2-en-6-one and its derivatives with sulfur dioxide.

It is known that sulfur dioxide will add to unsaturated monomers containing an olefinic linkage represented, for example, by olefins such as ethylene, propene, isobutylene, 2-butene, 2-pentene, 2-hexene, cyclohexene, etc. and by vinyl monomers such as vinyl chloride, allyl chloride, methyl acrylate, methyl methacrylate, styrene, methyl vinyl ketone, etc., to give high molecular weight resins. However, on exposure to high temperatures as in molding operations, such known resins have had only limited utility in that they decompose with the evolution of sulfur dioxide, unsaturated compounds and other decomposition products having unpleasant odors. The residual polymer turns black and expands into a voluminous, porous mass. Many additives have been proposed as stabilizing agents to cure this deficiency in hitherto known polysulfone polymers. These additives or processes for stabilization have not been altogether satisfactory from a commercial standpoint. We have now found that polysulfone resins which are inherently stable to high temperatures and many of which have softening points of 250° C. or more can be prepared by reacting bicyclo(3.2.0)hept-2-en-6-one and its derivatives with sulfur dioxide. The polysulfone resins of the invention are valuable materials for preparing thermally stable films, fibers and molded articles.

It is, accordingly, an object of the invention to provide a new class of polysulfone resins which are very stable thermally. Another object is to provide novel polysulfone resins containing bicyclo(3.2.0)hept-2-en-6-one or its derivatives. Another object is to provide thermally stable films, fibers and molded articles from the new class of polysulfone resins. Another object is to provide a process for preparing the said new class of polysulfone resins. Other objects will become apparent hereinafter.

In accordance with the invention, we prepare our new class of polysulfone resins by polymerizing, i.e., contacting with sulfur dioxide at temperatures of from —30 to 50° C. and preferably of from —10 to 30° C. one or more compounds having the general formula:

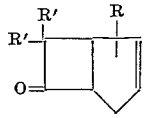

wherein R is selected from the group consisting of a hydrogen atom and a methyl radical, and R' is selected from the group consisting of a hydrogen atom and an alkyl group of from 1–4 carbon atoms. These compounds can be prepared by reacting cyclopentadiene or methyl cyclopentadiene with ketene or its dialkyl derivatives. Details of these preparations can be found in Helvetica Chemica Acta 7, 21 (1924).

Although the polymerization of these compounds can be carried out at low temperatures in excess sulfur dioxide, a particularly useful method is to carry out the reaction in an inert solvent medium which is capable of dissolving relatively large amounts of sulfur dioxide at room temperatures, for example, in water, in a lower alkanol such as methanol, ethanol, isopropanol, etc., a mixture of alcohol and water, dimethylformamide, dimethyl-acetamide, etc. By using such solvent medium, the polymerization can be performed at normal atmospheric pressures. However, good results are also obtained at lower or higher than atmospheric pressures. Where water is employed as the inert medium, an emulsifying agent such as the alkali metal salts of certain alkyl acid sulfates, e.g., sodium lauryl sulfate, can advantageously be employed. The concentration of the polymerization catalyst can vary from 0.1–2.0% or more, based on the total weight of the bicycloheptene derivative and the sulfur dioxide.

Derivatives of bicyclo(3.2.0)hept-2-en-6-one suitable for use in the present invention include 7,7-dimethylbicyclo[3.2.0]hept - 2 - en-6-one, 7,7-diethylbicyclo[3.2.0] hept-2-en-6-one, 1 - methyl - 7,7 - dimethylbicyclo[3.2.0] hept-2-en-6-one, and 7,7-dibutylbicyclo[3.2.0]hept-2-en-6-one.

Many catalysts are effective for the above polymerizations and include one or more oxygen yielding peroxides, for example, peroxygen polymerization catalysts such as hydrogen peroxide, benzoyl peroxide, acetyl peroxide, acetyl benzoyl peroxide, lauryl peroxide, oleoyl peroxide, triacetone peroxide, urea peroxide and t-butyl hydroperoxide, alkyl percarbonates, perborates, e.g., alkali metal perborates such as those of sodium and potassium, etc., persulfates, e.g., ammonium persulfate and alkali metal persulfates such as sodium and potassium, etc., or other oxygen yielding polymerization catalysts including alkali metal nitrates such as lithium nitrate.

One method for determining the thermal stability of the polysulfones is to measure the weight loss of a weighed sample when heated to a given temperature for a period of time. This procedure is illustrated in U.S. Patent 2,742,447 (Phillips Petroleum, 1952) titled "Stabilization of Polysulfone Resins With a Benzimidazolethiol." The table shown below is taken from this patent and illustrates the effectiveness of several stabilizers on a polysulfone prepared from butene-1 and sulfur dioxide.

| Stabilizer | Percent loss in weight at end of $x$ hours heating at 375°±2° F. | | |
|---|---|---|---|
| | 0.5 | 1 | 3 |
| Control | 12.8 | 18.3 | 30.5 |
| 2 wt. percent 2-benzimidazolethiol | 3.5 | 15.2 | 25.1 |
| 1 wt. percent 5-methyl-2-benzimidazolethiol | 3.0 | 12.0 | 19.8 |
| 1 wt. percent 5-chloro-2-benzimidazolethiol | 1.6 | 3.8 | 14.8 |

The following table shows the stability of two polysulfones prepared from bicyclo[3.2.0]hept-2-en-6-one derivatives with no stabilizer.

| Composition of Polymer | Percent loss in weight at end of $x$ hours at 375°–380° F. | | |
|---|---|---|---|
| | 0.5 | 1 | 3 |
| 7,7-dimethylbicyclo[3.2.0]hept-2-en-6-one | 3.1 | 5.6 | 12.3 |
| Bicyclo[3.2.0]hept-2-en-6-one | 4.4 | 6.5 | 14.1 |

It is evident that the polysulfones prepared from the bicyclo[3.2.0]hept-2-en-6-ones are inherently quite stable thermally.

The following examples will further illustrate the invention:

Example 1

13.6 g. 7,7-dimethylbicyclo[3.2.0]hept-2-en-6-one, 150 ml. acetone, and 0.2 g. hydrogen peroxide were placed in a pressure bottle and cooled to −20° C. To this was added 12.8 g. sulfur dioxide. The bottle was capped and allowed to stand at room temperature for 20 hours. A white powdery polymer was obtained which weighed 16.0 g. Films cast from a dope of the polymer in methylene chloride had a hot-bar sticking point of 225–228° C.

Example 2

The following materials were placed in a bottle and chilled to −20° C.

| | |
|---|---|
| Bicyclo[3.2.0]hept-2-en-6-one _____g__ | 10.8 |
| Water _____ml__ | 40 |
| Lithium nitrate _____g__ | 0.1 |
| Lauryl alcohol sulfate _____g__ | 0.2 |

When chilled, 6.4 g. of sulfur dioxide was added, the bottle capped, and tumbled at 30° C. for 24 hr. A white polymer was obtained which after washing and drying weighed 10.1 g. Films of the polymer had a sticking point of 242–245° C.

Example 3

The following materials were placed in a flask which was immersed in an ethylene glycol-water bath at −25° C.

| | |
|---|---|
| 7,7-diethylbicyclo[3.2.0]hept-2-en-6-one ____g__ | 300 |
| Sulfur dioxide _____g__ | 150 |
| Methanol _____ml__ | 2000 |
| Cumene hydroperoxide _____g__ | 3 |

The reaction was stirred for 18 hours. A grainy, white polymer was obtained which weighed 292 g. It could be injection molded to produce clear, hard objects, thus demonstrating its thermal stability.

Example 4

The following materials were placed in a chilled bottle:

| | |
|---|---|
| 1 - methyl - 7,7 - dimethylbicyclo[3.2.0]hept-2-en-6-one _____g__ | 25 |
| Sulfur dioxide _____g__ | 19 |
| Water _____ml__ | 150 |
| Lithium nitrate _____g__ | 0.2 |
| Lauryl alcohol sulfate _____g__ | 0.4 |

A grainy, white polymer was obtained which had a sticking point of 212–218° C.

Example 5

The following materials were placed in a chilled pressure bottle and tumbled at 25–30° C. for 10 hrs.

| | G. |
|---|---|
| 7,7-dibutylbicyclo[3.2.0]hept-2-en-6-one _____ | 100 |
| Sulfur dioxide _____ | 200 |
| Tert-butyl hydroperoxide _____ | 0.5 |

A clear, viscous dope was obtained. The polymer was isolated by pouring the dope into cold alcohol with vigorous stirring. The yield was 140 g.

Example 6

The following materials were placed in a chilled flask:

| | |
|---|---|
| 7,7-diethylbicyclo[3.2.0]hept-2-en-6-one ____g__ | 164 |
| 1-methylbicyclo[3.2.0]hept-2-en-6-one _____g__ | 122 |
| Sulfur dioxide _____g__ | 150 |
| Dimethylformamide _____ml__ | 2500 |
| Acetyl peroxide _____g__ | 4 |

The reaction was stirred at room temperature for 16 hours. A clear, viscous dope was obtained which was poured into isopropyl alcohol to isolate the polymer. The yield was 375 g. of polymer which could be injection molded into clear, colorless objects.

The invention has been described in detail with particular reference to preferred embodiments thereof but it will be understood that variations and modifications can be effected within the spirit and scope of the invention as described hereinabove and as defined in the appended claims.

We claim:

1. A polysulfone resin prepared by reacting sulfur dioxide and a component consisting of at least one compound represented by the following general formula:

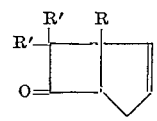

wherein R is a member selected from the group consisting of a hydrogen atom and a methyl radical, and R' is a member selected from the group consisting of a hydrogen atom and an alkyl group containing from 1–4 carbon atoms, and wherein the total molar amount of said component is essentially equal to the molar amount of said sulfur dioxide.

2. A polysulfone resin prepared by reacting essentially equimolar amounts of sulfur dioxide and bicyclo(3.2.0)hept-2-en-6-one.

3. A polysulfone resin prepared by reacting essentially equimolar amounts of sulfur dioxide and 7,7-diethylbicyclo(3.2.0)hept-2-en-6-one.

4. A polysulfone resin prepared by reacting essentially equimolar amounts of sulfur dioxide and 7,7-dimethylbicyclo(3.2.0)hept-2-en-6-one.

5. A polysulfone resin prepared by reacting essentially equimolar amounts of sulfur dioxide and 1-methyl-7,7-dimethylbicyclo(3.2.0)hept-2-en-6-one.

6. A polysulfone resin prepared by reacting essentially equimolar amounts of sulfur dioxide and 7,7-dibutylbicyclo(3.2.0)hept-2-en-6-one.

7. A polysulfone resin prepared by reacting sulfur dioxide and a component consisting of 7,7-diethylbicyclo(3.2.0)hept-2-en-6-one and 1-methylbicyclo(3.2.0)hept-2-en-6-one, wherein the total molar amount of said component is essentially equal to the molar amount of said sulfur dioxide.

8. A process for preparing a polysulfone resin which comprises reacting at a temperature of from −10 to 50° C. in the presence of a free-radical catalyst, essentially equimolar amounts of sulfur dioxide and a component consisting of at least one compound represented by the following general formula:

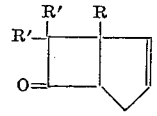

wherein R is a member selected from the group consisting of a hydrogen atom and a methyl radical, and R' is a member selected from the group consisting of a hydrogen atom and an alkyl group containing from 1–4 carbon atoms.

9. The process of claim 8 wherein the compound is bicyclo(3.2.0)hept-2-en-6-one.

10. The process of claim 8 wherein the compound is 7,7-diethylbicyclo(3.2.0)hept-2-en-6-one.

11. The process of claim 8 wherein the compound is 7,7-dimethylbicyclo(3.2.0)hept-2-en-6-one.

12. The process of claim 8 wherein the compound is 1-methyl-7,7-dimethylbicyclo(3.2.0)hept-2-en-6-one.

13. The process of claim 8 wherein the compound is 7,7-dibutylbicyclo(3.2.0)hept-2-en-6-one.

14. A process for preparing a polysulfone resin which comprises reacting at a temperature of from −10 to 50° C. in the presence of a free-radical catalyst, essentially equimolar amounts of sulfur dioxide and a component consisting of a mixture of 7,7-diethylbicyclo-(3.2.0)hept-2-en-6-one and 1-methylbicyclo(3.2.0)hept-2-en-6-one.

References Cited by the Examiner

UNITED STATES PATENTS 2,899,412  8/1959  Caldwell et al. _____ 260—79.3

OTHER REFERENCES

Staudinger et al., Helvetica Chemica Acta, 7 (1924), pp. 19–22.

LEON J. BERCOVITZ, *Primary Examiner.*

DONALD E. CZAJA, *Examiner.*

J. J. KLOCKO, *Assistant Examiner.*